L. STEIN AND L. BRUMER.
HOSE COUPLING.
APPLICATION FILED MAY 29, 1920.
1,368,068.
Patented Feb. 8, 1921.
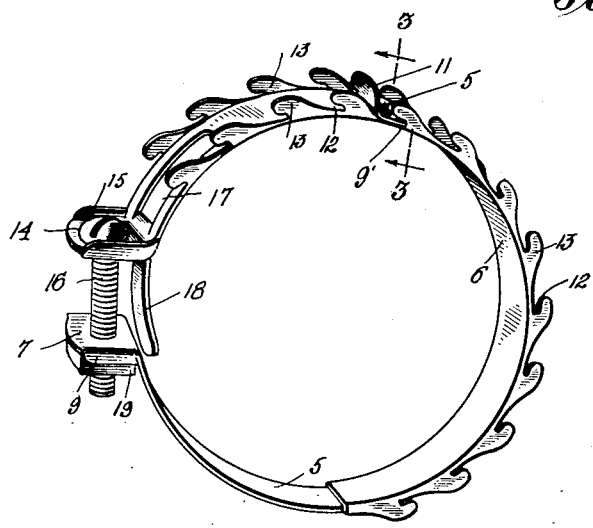
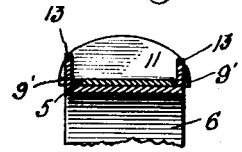
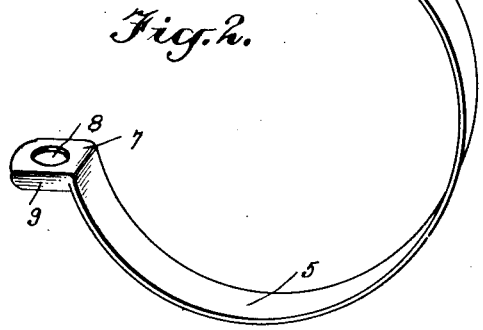
WITNESSES
INVENTORS
L. STEIN
L. BRUMER
BY
ATTORNEYS

UNITED STATES PATENT OFFICE.

LOUIS STEIN, OF NEW YORK, AND LOUIS BRUMER, OF BROOKLYN, NEW YORK.

HOSE-COUPLING.

1,368,068.  Specification of Letters Patent.  Patented Feb. 8, 1921.

Application filed May 29, 1920. Serial No. 385,257.

*To all whom it may concern:*

Be it known that we, LOUIS STEIN and LOUIS BRUMER, citizens of Poland, and residents, respectively, of the city of New York, borough of the Bronx, in the county of Bronx and State of New York, and borough of Brooklyn, in the county of Kings and State of New York, have invented a new and Improved Hose-Coupling, of which the following is a full, clear, and exact description.

The present invention relates to new and useful improvements in hose couplings, and it pertains more particularly to a device especially constructed for clamping the hose to the coupling member and commonly known as "hose clamps."

It is one of the primary objects of the present invention to so construct a hose clamp that various degrees of adjustment may be had, thus adapting the device for use in connection with hose and hose couplings of various sizes.

It is a further object of the invention to so construct the clamp that it will have contact with the hose throughout its entire inner circumference, thus avoiding pinching of the hose and insuring a tight joint between the hose and the coupling member.

It is a still further object of the invention to so construct a hose clamp that the same may be readily positioned and tightened in place upon the hose.

With the above and other objects in view, reference is had to the accompanying drawing in which—

Figure 1 is a perspective of a hose clamp constructed in accordance with the present invention.

Fig. 2 is a perspective view of one of the elements making up the clamp.

Fig. 3 is a detail, sectional view taken on the line 3—3 of Fig. 1.

Referring more particularly to the drawings, the clamp comprises two members 5 and
6. The member 5 is formed from a single strip of material and on one of its ends it is provided with a radial projection 7. This radial projection 7 is perforated as indicated by the reference character 8, and it is provided on two of its opposite sides with right angularly disposed shoulders 9, the purpose of which will be hereinafter more fully described.

At its other end the member 5 is cut out, as indicated at 10, to provide shoulders 9' and upon this extremity said member 5 is bent outwardly to form a thumb or finger piece 11.

The member 6 is substantially channel shaped in cross-section and the flanges of the channel are disposed outwardly and notched or cut, as indicated at 12, to form a plurality of hooked projections 13. These hooked projections are arranged oppositely to each other in pairs and extend throughout the major portion of the member 6.

One end of the member 6 is provided with a radially projecting portion 14, upon opposite sides of which are formed flanges 15, and said radial portion 14 is perforated to receive a bolt or screw 16.

The member 6 is cut out, as indicated at 17, near the radially disposed portion 14 and the cut-out portion is bent backwardly to form a tongue 18, which tongue serves to overlap the joint between the members 5 and 6.

In operation, the bolt or screw 16 is passed through the opening in the portion 14 of the member 6 and the perforation 8 in the portion 7 of the member 5, after which a nut 19 is positioned between the flanges 15 of the portion 6 to prevent its turning during the operation of threading the bolt or screw thereinto.

After the parts have been so assembled, the thumb or finger piece 11 of the member 5 is grasped in one hand and the member 6 in the other and the device is placed around the hose. After the device has been placed around the hose, the member 5 is moved relative to the member 6, and it is tightened as far as possible, after which the shoulders 9 are engaged in the cut-out portion 12 of two of the hooked members 13 as indicated in Fig. 1.

The clamp is then tightened in position by inserting a screwdriver in the eye of the bolt or screw 16 and turning the same, pulling the free ends of the members 5 and 6 together and firmly seating the clamp with respect to the hose.

From the foregoing it will be apparent that the present invention provides a hose clamp in which wide range of adjustability is obtained. Furthermore, a hose clamp constructed in accordance with the present invention is readily attached and at the same time, the clamp will have contact with the hose throughout its entire inner circumference, thus preventing pinching of the hose and insuring a tight clamping thereof with respect to the element to which the hose is attached.

We claim:

1. A hose clamp, comprising a pair of substantially semi-circular members, one of which is channel shaped in cross-section, said channel being notched to form projecting fingers arranged in pairs, means carried by one of said semi-circular members and adapted to engage the fingers to prevent relative sliding movement of the semi-circular members, and means carried by the free ends of said semi-circular members for securing them in operative position.

2. A hose clamp comprising two substantially semi-circular members adapted for interengagement with each other, one of said members being channel shaped in cross section, a plurality of undercut hooks formed by cutting the walls of the channel of said channel members, said hooks being formed in such a manner as to be opposite to each other in pairs, and means carried by the other of said semi-circular members for interengagement with said hooks to prevent sliding movement of the members relative to each other.

3. A hose clamp comprising two substantially semi-circular members adapted for interengagement with each other, a plurality of undercut projections formed on the opposite side edges of one of said members and arranged at right angles to the body portion thereof, the other of said members being reduced to lie between the undercut projections and having an enlarged end portion adapted for engagement with the undercut projections to prevent relative movement of the two members, and means for securing said members in operative position.

LOUIS STEIN.
LOUIS BRUMER.